United States Patent [19]

Smith

[11] Patent Number: 5,013,438

[45] Date of Patent: May 7, 1991

[54] FLUID FILTER MEDIUM INCLUDING A TUBULAR FABRIC MEMBER

[76] Inventor: Lawrence Smith, 206 E. Hwy. 90, Lot 3, Iowa, La. 70647

[21] Appl. No.: 435,758

[22] Filed: Nov. 14, 1989

[51] Int. Cl.$^5$ .............................................. B01D 27/06
[52] U.S. Cl. .................................... 210/455; 210/457; 210/487; 210/493.1; 55/497
[58] Field of Search ............... 210/345, 346, 347, 455, 210/457, 493.1; 55/497, 502

[56] References Cited

U.S. PATENT DOCUMENTS

| | | | |
|---|---|---|---|
| 1,218,848 | 3/1917 | Foster | 210/307 |
| 2,420,414 | 5/1947 | Briggs | 210/457 |
| 3,486,626 | 12/1969 | Close | 210/493.1 |
| 3,633,753 | 1/1972 | Petitjean | 210/457 |
| 3,633,757 | 1/1972 | Madern | 210/457 |
| 4,615,803 | 10/1986 | Tarala | 210/457 |

*Primary Examiner*—Robert A. Dawson
*Assistant Examiner*—Abeer Daoud
*Attorney, Agent, or Firm*—Arnold, White & Durkee

[57] ABSTRACT

An improved fluid filter medium, including a fabric member having a plurality of folds that are seamed at the top and bottom to form a fabric sleeve with pockets, such pockets being configured to enclose the leaves of a filter element frame. A tubular seal is seemed to each end of the fabric sleeve and filled with a resilient material to form a compressible seal. Each tubular seal is configured to be compressed between the central cylindrical perforated core of the filter element frame and a sealing plate or flange such that, upon compression, the tubular seal forms a seal between the sealing plates or flanges and the fabric sleeve.

21 Claims, 4 Drawing Sheets

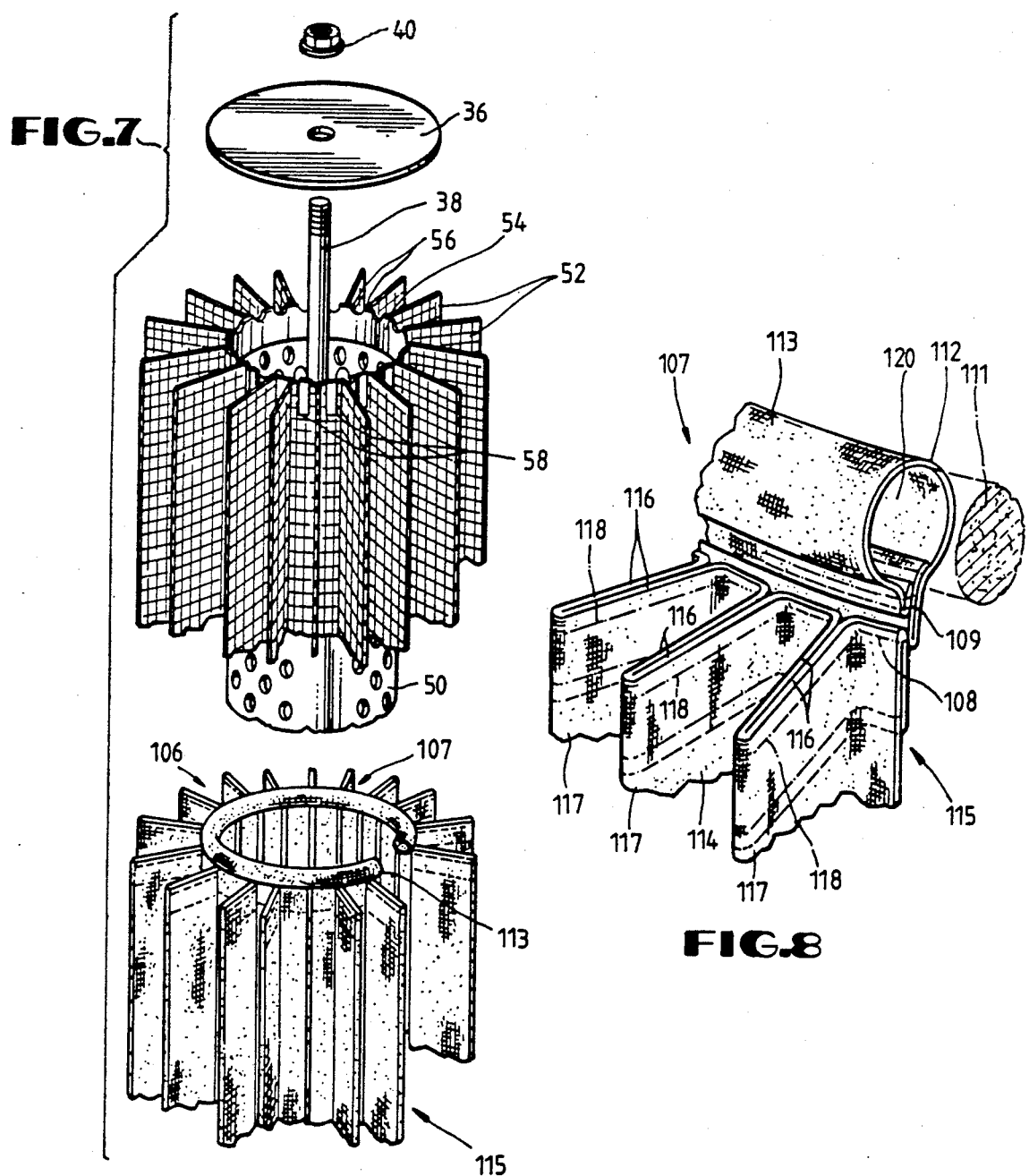

FLUID FILTER MEDIUM INCLUDING A TUBULAR FABRIC MEMBER

BACKGROUND OF THE INVENTION

This invention relates in general to fluid filters and more particularly to an improved construction for a filter medium and seal for filters of the type having removable filter elements and cleanable or replaceable filter media.

Fluid filters, including filters for liquids and gases, are in widespread use. It is desirable in such filters to provide a filter medium that is supported and sealed in use in a manner which substantially eliminates leaks without reducing the efficiency of the filter. In the past, providing a substantially leak-free seal for removable filter media has been difficult. Where attempts have been made to glue gasket seals onto the remainder of the filter medium, some leakage has occurred through gaps in the adhesive. Additionally, where gasket seals have been glued onto the rest of the filter element, the glue has deteriorated under certain pH conditions and temperature changes, causing leakage. Further, where gaskets are utilized, the gaskets can deform and shrink under pressure, particularly when a high pressure differential exists across the filter medium, allowing contaminant by-pass.

It has been another problem with prior filter medium and seal constructions that the methods used for forming a leak-proof seal have tended to reduce the efficiency of the filter. Where such filters have utilized a gasket under pressure, the force necessary to create a leak-proof seal to the gasket has, due to the construction of the filters, caused deformation and fatigue of the filter-medium supporting frame and reduced the efficiency of the filters. Further, where a neck has been utilized to form a surface to which the filter medium can be clamped, up to three (3) inches in length of the filter and up to 25% of the filter surface area have been lost in order to provide space for the neck.

Exemplary prior art filters are shown in U.S. Pat. Nos. 1,218,848; 2,420,414; 3,486,626; 3,633,753; 3,633,757 and 4,615,803. Additional prior art constructions are illustrated in the accompanying drawings.

It is a feature of this invention to provide a fluid filter medium that eliminates potential leakage paths that were present in many prior art filters.

It is another feature of this invention to provide a fluid filter medium that can operate at higher fluid pressures, and at greater pressure differentials across the filter medium, than prior art filters.

It is still another feature of this invention to provide a fluid filter medium that will increase the filter surface area and efficiency of the filter over some prior art filters by avoiding the requirement of a neck to clamp the filter medium.

SUMMARY OF THE INVENTION

Briefly stated and in accordance with a presently preferred embodiment of this invention, a fluid filter medium includes a fabric sleeve and a fabric member at each end of the fabric sleeve. The fabric sleeve has a plurality of pockets configured to enclose a filter element frame, including the cylindrical perforated core and plurality of radially extending leaves of such filter element frame, such that one leaf extends into each pocket of the fabric sleeve. Each tubular fabric member is made from the same type of fabric as the fabric sleeve and is attached by continuous and uniform stitching at one end of the tubular fabric member to an end of said fabric sleeve, while the other end of such tubular fabric member forms a tubular seal. Each such tubular seal is filled with a resilient material and is hand-stitched to each pocket.

The fluid filter medium is designed to be used with the filter element frame, and compressed by a planar sealing plate or flange held in position by any convenient means, such as described in detail in prior art U.S. Pat. No. 4,615,803, entitled Fluid Filter and issued to Frederick E. Tarala, the entire disclosure of which is incorporated herein by reference.

BRIEF DESCRIPTION OF THE DRAWINGS

While the aspects of the invention that are regarded novel are described with particularity in the appended claims, the invention itself, together with further advantages and features thereof, may be more readily understood by reference to the following detailed description taken in connection with the accompanying drawings in which:

FIG. 7 is a partial isometric view of the filter medium with a compressed tubular seal in accordance with this invention.

FIG. 8 is a partial isometric view of the filter medium and a noncompressed tubular seal in accordance with this invention.

DETAILED DESCRIPTION OF AN ILLUSTRATIVE EMBODIMENT

Figure 1:
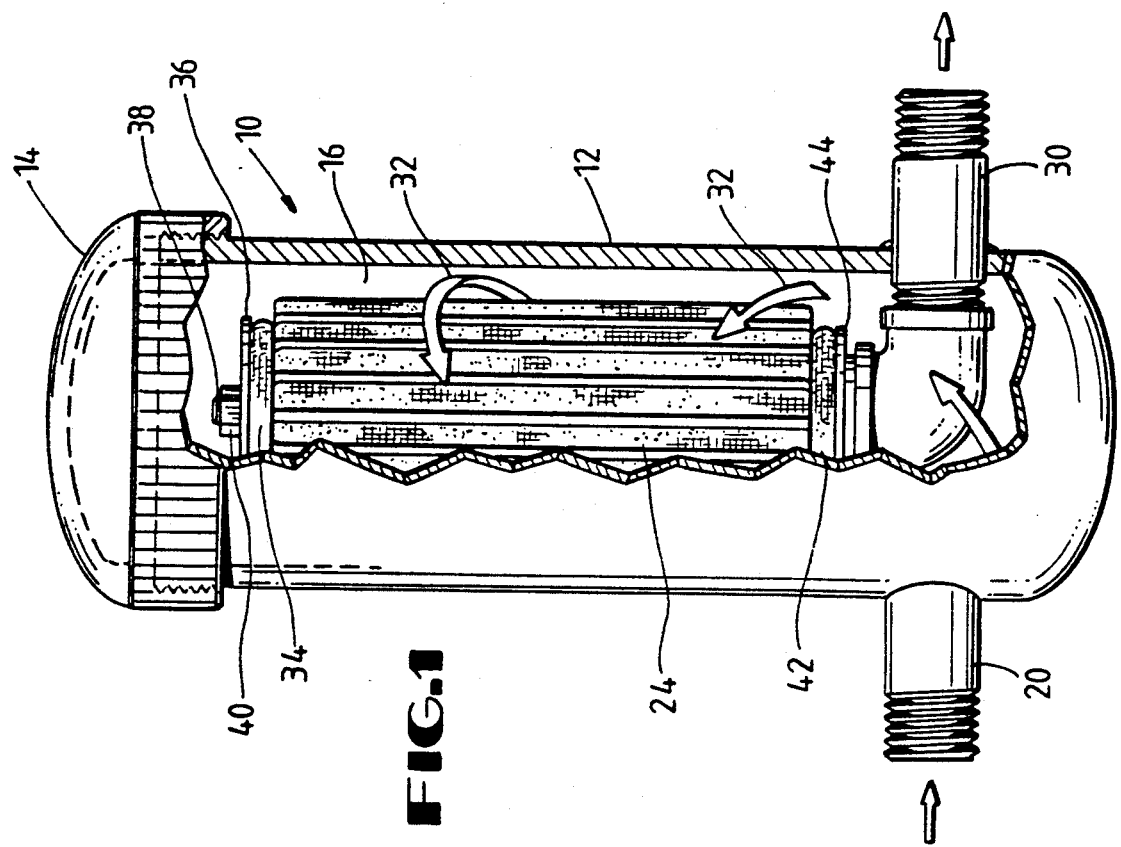
FIG. 1 is a cut-away view of a filter assembly of the type in which a filter seal in accordance with this invention may be used.

Turning now to FIG. 1, a filter assembly 10 is illustrated having a housing including a hollow tubular body 12 and an end cap 14 forming a sealed inner chamber 16. An inlet pipe 20 passes through housing 10 and communicates with chamber 16. A filter element 24 is disposed within chamber 16. Filter element 24 is adapted to pass the filtrate through a filter medium and out an exit pipe 30. The direction of fluid flow is shown generally by arrows 32.

In the past, filter element 24 has been sealed at one end by a gasket 34 and a sealing plate 36, which are held in position by any convenient means, such as nut and bolt 38 and 40 that extend axially through the filter element. A similar gasket 42 and plate 44 are employed at the opposite end of filter element 24.

Figure 2:
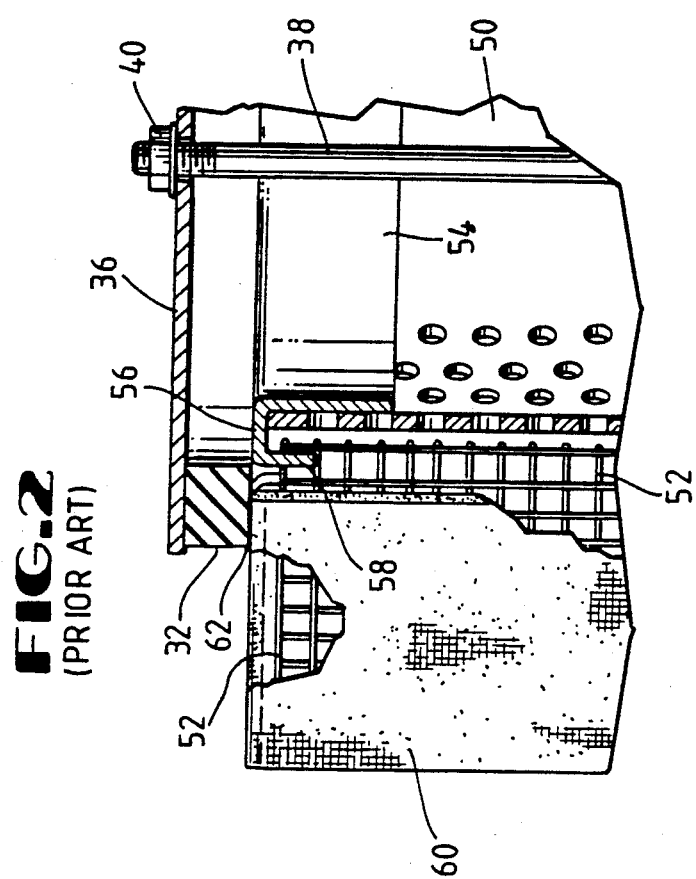
FIG. 2 is a fragmentary side elevational view, partly in section, of a filter element in accordance with the prior art.

Further details of the construction of a removable filter element 24, in accordance with the prior art may be seen by referring now to FIG. 2. In this and the remaining figures, like and corresponding elements are designated by like reference numerals.

FIG. 2 is a side elevational view of a portion of filter element 24 showing parts thereof in section. Filter element 24 comprises a generally cylindrical hollow core 50 and a filter medium supporting frame 52 that comprises a web of preferably resilient lattice material, such as a wire lattice formed into a circular array of outwardly extending leaves. Frame 52 is attached to core 50 by generally U-shaped attaching bracket 54 that has a cylindrical inner portion engaging the inner surface of core 50, an outwardly extending flange 56 traversing the end of core 50 and a plurality of fingers 58 engaging inner bights of the filter medium supporting frame 52 between adjacent leaves.

A filter medium 60 is carried by supporting frame 52. Preferably, filter medium 60 is made of a material capable of passing the filtrate while blocking the passage of impurities. Woven and nonwoven sheets of fiber, both natural and artificial, are known to provide this function. Conventionally, filter medium 60 is formed from a sheet of filter material sewn to provide a plurality of pockets therein, each pocket carried by one leaf of the supporting frame.

Reference to FIG. 2 reveals that the filter medium is formed into a serpentine arrangement and pockets are formed by fastening adjacent portions together along the top and bottom edges. The top of each pocket is folded over to provide a surface for attaching a gasket 34. Typically, gasket 34 has been attached to the surface formed by folded-over upper portions or flaps of filter medium 60, for example by gluing, in an attempt to provide a seal between the gasket and the filter medium.

Reference to FIG. 2 reveals a number of problems associated with some prior art filter seal constructions. While folded-over upper portions or flaps of filter medium 60 have been required to provide a sealing surface for attaching gasket 34, these flaps impair the flow of filtrate through the filter element by closing off the upper and lower portions of the spaces between adjacent pockets of filter medium. As such, increased pressure drops have been produced by prior art filters utilizing this construction.

Additionally, this prior art construction is particularly susceptible to leakage between the gasket 34 and the filter medium 60 at the point where the flaps of the filter medium 60 are formed between the adjacent pockets of filter medium 60. Leakage at this point may sometimes be impossible to avoid because of the fold naturally formed in the top edge of the filter medium 60 when the flaps are bent over to form the sealing surface. Similar leakage occurs due to deterioration of glue used to attach the gasket at certain pH's and changing temperatures.

A still further disadvantage of this prior art construction is the reduced filter efficiency that occurs due to the deformation of supporting frame 52 when the filter element 24 is installed in its housing. Since gasket 34 is sealed to flaps 62 by gluing or sewing as heretofore described, and to plate 36 by pressure, pressure is exerted on supporting frame 52 when the filter element 24 is installed. Deformation of supporting frame 52 results from the pressure exerted on the filter element 24 as it is placed under pressure between plates 36 and 44 in order to form a seal to gaskets 34 and 42, respectively. Such deformation causes supporting frame 52 to deflect outwardly from core 50 and adjacent leaves of the frame to deflect towards each other, thereby reducing the inter-leaf space, impeding the flow of filtrate and increasing the pressure drop across the filter.

Figure 3:
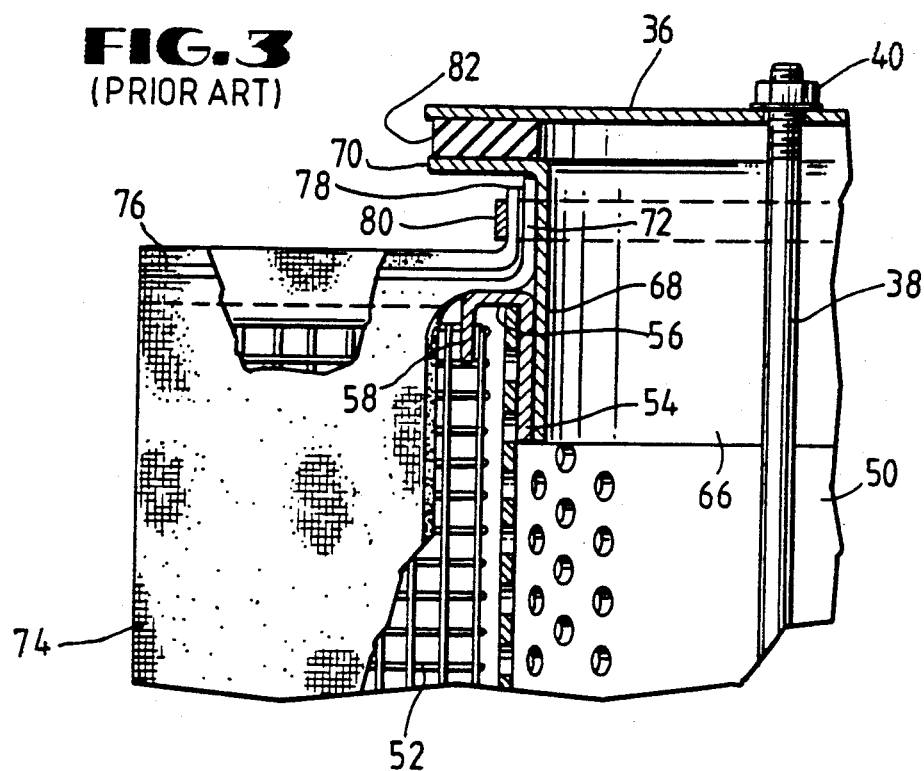
FIG. 3 is a fragmentary side elevational view, partly in section, of another filter element in accordance with the prior art.
Figure 4:
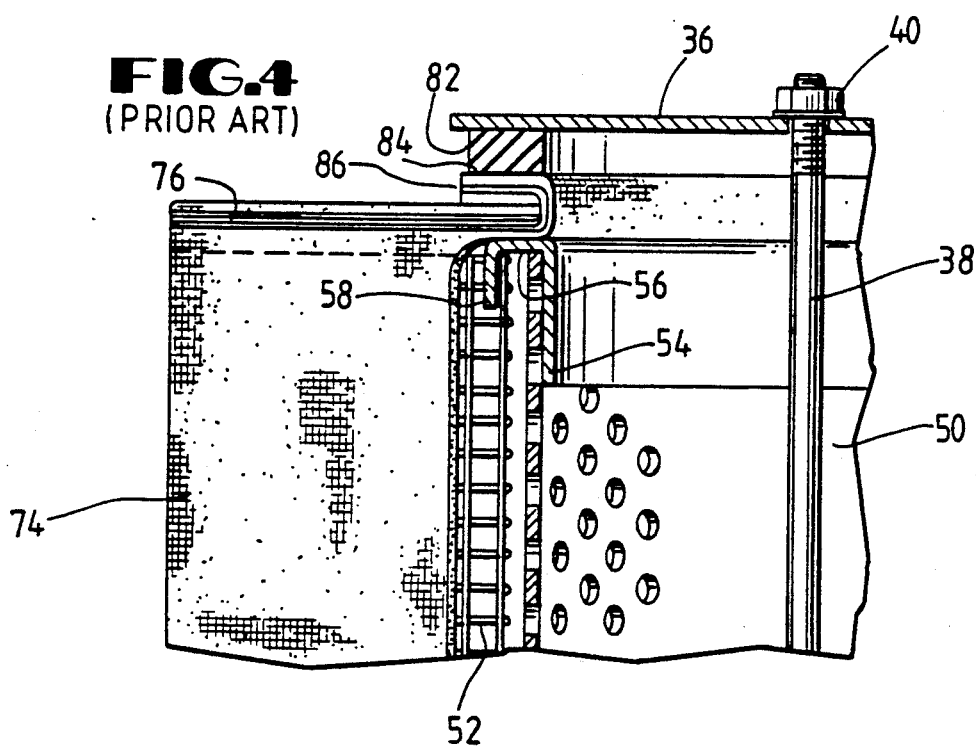
FIG. 4 is a partial side elevational view of another filter element in accordance with the prior art.

A further disadvantage of prior art filter constructions may be appreciated by referring to FIGS. 3 and 4. FIG. 3 is a fragmentary side elevational view, partly in section, of a filter element differing in certain regards from filter element 24. The filter element designated generally at 65 includes a cylindrical perforated core 50 and has been attached thereto by attaching ring 54 that, along with core 50, is conventional and has been constructed as heretofore described in connection with FIGS. 1 and 2.

A neck or coupling member 66 has been attached to ring 54 and includes a generally cylindrical neck portion 68 having a flange 70 extending outwardly therefrom at one end of the coupling member. Flange 70 of coupling member 66 has been spaced above flange 56 of attaching ring 54 in an attempt to form a sealing area 72.

A filter medium 74 comprises a web of filter material joined at the top and bottom edges thereof to form a plurality of pockets, each adapted to receive one leaf of supporting frame 52. A clamp 80, as seen in FIG. 3, has been used to hold neck portion 78 of filter medium 74 in engagement with neck 68 of coupling member 66. A gasket 82 has been disposed on an upper surface of flange 70 when the filter assembly is in use.

A modification of the filter medium construction shown in FIG. 3 is illustrated at FIG. 4. A filter medium 74, identical in structure to the filter medium heretofore described, is carried by frame 52. The neck portion 86 of filter medium 74 has been formed into a U-shaped bight disposed on horizontal flange 56 of bracket 54. An inner surface 84 of neck 86 has been attached to a gasket 82. A plate 36 has been employed to compress gasket 82 and folded-over neck portion 86 of medium 74 between the plate 36 and the bracket 54.

Reference to FIGS. 3 and 4 reveals a number of problems associated with these prior art filter medium constructions. Where, as in the filter shown in FIG. 3, a coupling member 66 has been utilized in an attempt to form a sealing area 72, up to 3 inches of the length of the filter element and up to 25% of the filter surface area can be lost. Further, the gasket 82 utilized in the filter shown in FIG. 4 can deform and shrink under pressure, allowing contaminant by-pass. Additionally, where glue is used to attach gasket 82 to the inner surface 84 of neck 86, the glue is subject to deterioration at certain pH conditions and temperature changes, leading to leakage.

Figure 5:
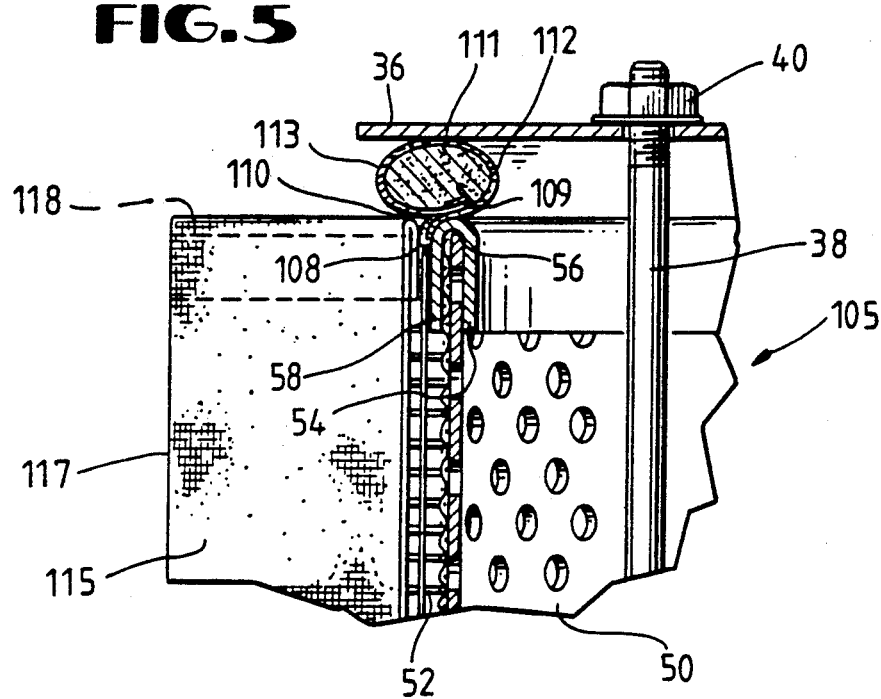
FIG. 5 is a partial side elevational view of a filter medium and tubular seal in accordance with this invention.
Figure 6:
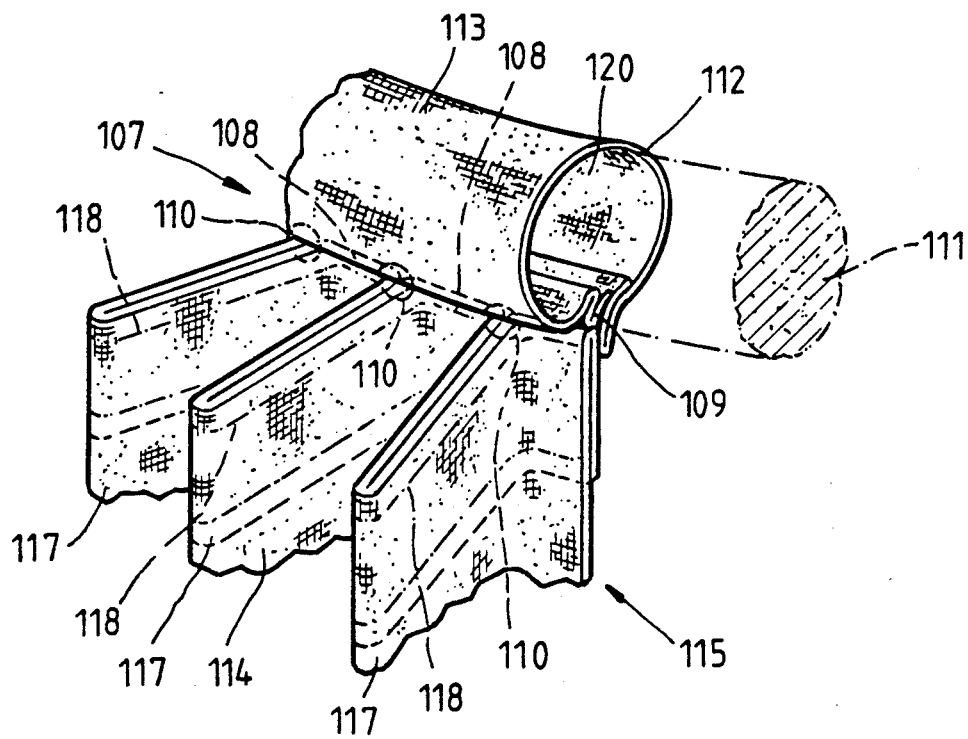
FIG. 6 is a fragmentary exploded view of a filter medium and tubular seal in accordance with this invention and the supporting filter element frame.

These and other disadvantages of prior art filter constructions are substantially eliminated by Applicant's new filter medium as seen in FIGS. 5-8. FIG. 5 is a fragmentary side elevational view, partly in section, of a filter seal in accordance with this invention. The filter element designated generally at 105 includes a cylindrical perforated core 50 and a supporting frame 52 attached to core 50 by attaching ring 54, conventionally designed and constructed as heretofore described in connection with FIGS. 1-4.

As seen in FIGS. 5-8, a filter medium 106 comprises both a fabric sleeve 115 and a tubular fabric member 107 at each end of the fabric sleeve 115. The fabric sleeve 115 comprises a continuous piece of generally rectangularly shaped filter medium fabric 114. The filter medium fabric 114 is folded into parallel folds 116 and sealingly joined along the top and bottom edges with seam 118, such that the parallel folds 116 are joined to form a fabric sleeve 115 with a plurality of evenly spaced pockets 117.

Each pocket 117 of the fabric sleeve 115 is adapted to receive at least one leaf of supporting frame 52. The last pocket of the fabric sleeve 115 is designed to fit snugly over either the first pocket, or a portion of the filter medium fabric 114 preceding the first pocket which is not joined along its top and bottom edges with seam 118 but is folded to partially enclose a leaf of the supporting frame 52. The last pocket of fabric sleeve 115 is then sealingly joined to the first pocket, or portion of filter medium fabric preceding the first pocket, by seaming, hand-stitching, clamping, or the like. When the last pocket of the fabric sleeve 115 is fit snugly Over the first pocket, or portion of filter medium fabric preceding the first pocket, the fabric sleeve 115 forms a plurality of evenly spaced and radially extending pockets, such that the fabric sleeve 115 encloses the leaves of supporting frame 52 and the outer sides, but not the ends, of the perforated core 50.

In accordance with the presently preferred embodiment of the invention, each tubular fabric member 107 is formed from a generally rectangularly shaped filter medium fabric 112. Each piece of fabric 112 is sealingly joined to the inner side of one of the ends of the fabric sleeve 115 by continuous and uniform stitching 108. Each piece of fabric 112 is then formed into a tubular seal 113 by outwardly folding the edge opposite to the attached edge of fabric 112 to form a hollow tube 120, and attaching the outwardly folded edge of the fabric 112 with continuous and uniform stitches 109 to a place on the fabric 112 a short distance from the location where the fabric 112 is joined to the fabric sleeve 115. The tube 120 is filled with a resilient material 111, preferably comprising one or more continuous length rope sections. After the fabric sleeve is wrapped around the leaves of the supporting frame 52, the opposite ends of the resilient material 111 are seamed together such that the resilient material 111 forms a continuous, generally circular filling for the tubes 120. The opposite ends of each piece of fabric 112 are then joined together by overlapping one end over the other, such that a portion of one end of the tube 120 will be enclosed by the other end of the tube 120 and a generally circular tube 120 is formed, Which is filled with resilient material 111. The opposite ends of each piece of fabric 112 are then sealingly joined by hand-stitching together the overlapping ends of each piece of fabric 112. The tubular seal 113 is also attached by hand stitching 110 to the filter medium pockets 117.

Each piece of fabric 112 is preferably made of the same type of fabric as the filter medium fabric 114. The following materials are illustrative of the types of materials that may be used when making the filter medium fabric 114 and tubular fabric members 107: cotton, nylon, rayon, rayon/nylon mix, stainless steel mesh, galvanized steel mesh, polybenzimidazole, kevlar, matted glass, polyester, woven cotton, woven fiberglass, woven nylon, woven teflon, woven polypropylene, rayon felt, wool felt, dacron felt, fiberglass felt, iconel felt, polyester felt, polypropylene felt, nomex felt, and rayon/nylon felt.

When the tubular seals 113 are compressed by sealing plates 36 and 44, a seal is formed between the sealing plates 36 and 44 and the fabric sleeve 115. Further, the tubular seals 113 are preferably located such that when the tubular seals 113 are compressed, the stitchings 108 and 109 are either covered by the compressed tubular seals 113 or are enclosed by the tubular seals 113 and are not exposed On the exterior of the filter element 105. Additionally, the tubular seals 113 are located in such a manner that the compressive forces transmitted from the sealing plates 36 and 44, through the tubular seals 113, are preferably exerted on the perforated core 50 and not the leaves of the filter medium supporting frame 52.

The resilient material 111 filling the tubular seals 113 can be made from any type of material that is resilient and suitable for use in the filter. But, the presently preferred embodiment of the invention is such that the resilient material 111 filling the tubular seals 113 is made from the same type of fiber as the tubular fabric members 107 are made. The following materials are illustrative of the types of materials that may be used when making the resilient material 111 and tubular fabric members 107: cotton, nylon, rayon, rayon/nylon mix, stainless steel mesh, galvanized steel mesh, polybenzimidazole, kevlar, matted glass, woven cotton, woven fiberglass, woven nylon, woven teflon, woven polypropylene, rayon felt, wool felt, dacron felt, fiberglass felt, iconel felt, polypropylene felt, nomex felt, and rayon/nylon felt. However, when the tubular fabric members 107 are made from a polyester fabric, it is preferred that the resilient material 111 filling the tubular seals 113 is made from either a nylon or cotton fiber wrapped in a polyester fiber.

Because tubular seal 113 compresses to form a seal over the fabric sleeve 115 between plates 36 and 44 and core 50, the necessity for providing flaps to form a sealing surface at the end of the filter element 105 is eliminated and the flow of filtrate past the leaves of the filter element 105 is greatly enhanced. Likewise, the necessity for utilizing gaskets 34, 82 to form a seal between plates 36 and 44 and the filter medium 106, Or of utilizing a coupling member or neck 66, are eliminated. Still further, the inherent tendency of some prior art constructions to leak at the point where the gasket 34 was attached to the filter medium 60 is virtually eliminated.

It will be appreciated that the filter structure seen in FIGS. 5–8 substantially eliminates the problems heretofore discussed in connection with prior art filter seals. Because tubular seal 113 is supported by flange 56 and core 50, deformation of frame 52 does not occur when the filter element 105 is installed in a filter assembly 10. Sealing pressure from plates 36 and 44 is transmitted by tubular seals 113 to flange 56 and core 50, which may be sufficiently rigid to absorb such stress without significant deformation. Deformation of frame 52 is virtually eliminated and pressure drop across the filter is maintained at a substantially constant level.

While the invention has been shown in connection with certain presently preferred embodiments thereof, those skilled in the art will recognize that many modifications may be made therein without departing from the true spirit and scope of the invention. Accordingly, it is intended that the following claims cover all equivalent modifications and variations as fall within the scope of the invention.

I claim:

1. A filter medium in combination with a filter element frame including a central cylindrical perforated core and a plurality of attached filter leaves extending radially outward from the core, comprising:

a fabric sleeve having opposite ends and a plurality of
        radially extending pockets configured to enclose the leaves and the outer side, but not the ends, of the perforated core of such filter element frame, with a separate pocket enclosing each such leaf;

each end of such sleeve terminating in a continuous tubular fabric member extending along the periphery of such end;

a resilient material filling each such tubular fabric member; and each such tubular fabric member being spaced from the outer edge of such pockets, a distance sufficient to enable the tubular fabric member to be compressed against an end of the perforated core and not the leaves of such filter element frame.

2. A filter medium according to claim 1, wherein each such tubular fabric member sealingly engages a planar sealing plate or flange.

3. A filter medium according to claim 1, wherein each such tubular fabric member is seamed such that, when each such tubular fabric member is compressed, the seams on each such tubular fabric member are covered by the compressed tubular fabric member.

4. A filter medium according to claim 1, wherein one or more continuous length rope sections of resilient material fill each such tubular fabric member.

5. A filter medium according to claim 1, wherein each such tubular fabric member is made from the same type of fiber as said fabric sleeve.

6. A filter medium according to claim 1, wherein said seams are continuously and uniformly stitched.

7. A filter medium according to claim 6, wherein said seams are stitched with a thread of the same type of fiber as said fabric sleeve.

8. A filter medium according to claim 1, wherein said tubular fabric members and said resilient material filling said tubular fabric members are made from the same type of fiber.

9. A filter medium according to claim 1, wherein said resilient material filling said tubular fabric members is made from a nylon or cotton fiber wrapped in a polyester fiber, and said tubular fabric members are made from a polyester fabric.

10. A filter medium for a filter element frame of the type including a central cylindrical perforated core and a plurality of attached filter leaves extending radially outward from the core, comprising:

a continuous piece of filter medium fabric;

said piece of filter medium fabric folded to form parallel folds and seamed along opposite edges, configured to form a fabric sleeve having a plurality of radially extending pockets and opposite ends, with a separate pocket enclosing each filter leaf;

a first additional continuous piece of filter medium fabric being seamed to an end of such fabric sleeve, and a second additional continuous piece of filter medium fabric being seamed to the opposite end of such fabric sleeve;

said first and second additional pieces of filter medium fabric being folded to form first and second tubular fabric members, the folded end of the first additional piece of filter medium fabric being seamed to the first additional piece of filter medium fabric to form a first hollow tube, and the folded end of the second additional piece of filter medium fabric being seamed to the second additional piece of filter medium fabric to form a second hollow tube;

a resilient material filling each such hollow tube, such that said first hollow tube forms a first compressible tubular seal, and said second hollow tube forms a second compressible tubular seal; and, each such tubular fabric member being formed and seamed to said fabric sleeve in a manner such that, when each such compressible tubular seal is sealingly engaged, compressive forces are exerted on said perforated core and not the leaves of said filter element frame.

11. A filter medium according to claim 10, wherein said first and second compressible tubular seal sealingly engage a planar sealing plate or flange.

12. A filter medium according to claim 10, wherein each such tubular fabric member is seamed such that, when each such compressible tubular seal is compressed, the seams on each such tubular fabric member are covered by the compressed tubular seals.

13. A filter medium according to claim 10, wherein one or more continuous length rope sections of resilient material fill each such hollow tube.

14. A filter medium according to claim 10, wherein said first and second tubular fabric members are made from the same type of fiber as said fabric sleeve.

15. A filter medium according to claim 10, wherein said first and second compressible tubular seals are additionally seamed to each such radially extending pocket.

16. A filter medium according to claim 10, wherein said seams are continuously and uniformly stitched.

17. A filter medium according to claim 16, wherein said seams are stitched with a thread of the same type of fiber as said fabric sleeve.

18. A filter medium according to claim 10, wherein said first and second tubular fabric members and said resilient material filling said first and second hollow tube are made from the same type of fiber.

19. A filter medium according to claim 10, wherein said resilient material filling said first and second hollow tube is made from a nylon or cotton fiber wrapped in a polyester fiber, and said first and second tubular fabric members are made from a polyester fabric.

20. A filter medium for a filter element frame of the type including a central cylindrical perforated core and a plurality of attached filter leaves extending radially outward from the core, comprising:

a continuous piece of generally rectangularly shaped filter medium fabric;

said piece of filter medium fabric being folded to form parallel folds;

said piece of folded filter medium fabric being continuously and uniformly stitched along its top edge to join each parallel fold formed thereat and along its bottom edge to join each parallel fold formed thereat, in order to form a plurality of evenly spaced apart, radially extending pockets, such that at least one such pocket encloses each leaf of said filter element frame;

said piece of folded filter medium fabric completely surrounding the outer side, but not the ends, of the perforated core of said filter element frame;

a first and a second additional continuous piece of generally rectangularly shaped filter medium fabric made from the same type of fabric as said fabric sleeve;

said first additional continuous piece of filter medium fabric being continuously and uniformly stitched along one of its edges to the inner side of one end of said fabric sleeve;

said second additional continuous piece of filter medium fabric being continuously and uniformly stitched along one of its edges to the inner side of the opposite end of said fabric sleeve;

said first additional piece of filter medium fabric being folded outwardly to form a first tubular fabric member, the edge of said first additional piece of filter medium fabric opposite to the attached edge being joined by continuous and uniform stitching to said first additional piece of filter medium fabric to form a first hollow tube;

said second additional piece of filter medium fabric being folded outwardly to form a second tubular fabric member, the edge of said second additional piece of filter medium fabric opposite to the attached edge being joined by continuous and uniform stitching to said second additional piece of filter medium fabric to form a second hollow tube;

one or more continuous length rope sections of a resilient material filling each such hollow tube, such that said first hollow tube forms a first compressible tubular seal, and said second hollow tube forms a second compressible tubular seal; and, said first and second tubular fabric members being formed and stitched to said fabric sleeve in a manner such that, when said first and second compressible tubular seals are sealing engaged by compression against sealing plates, flanges, or the like, compressive forces are exerted on said perforated core and not the leaves of said filter element frame, and the stitching on the first and second tubular fabric members are covered by the compressed tubular seals.

21. A filter medium according to claim 20, wherein said first and second tubular seals are additionally seamed to each radially extending pocket.

* * * * *